United States Patent

Alvarez et al.

[11] Patent Number: 5,198,496
[45] Date of Patent: Mar. 30, 1993

[54] PROCEDURE FOR THE OBTENTION OF THERMOPLASTIC ELASTOMER MIXTURES

[75] Inventors: Juan M. A. Alvarez; Eusebio F. Miron; Jose M. T. Lopez, all of Madrid, Spain

[73] Assignee: Pepsol Quimica S.A., Madrid, Spain

[21] Appl. No.: 627,940

[22] Filed: Dec. 13, 1990

[30] Foreign Application Priority Data

Dec. 14, 1989 [ES] Spain ..................... P8904216

[51] Int. Cl.$^5$ ............... C08L 23/04; C08L 53/02; C08L 33/06
[52] U.S. Cl. .................... 525/93; 525/88; 525/98; 525/227; 525/240; 525/263
[58] Field of Search ............ 525/941, 93, 88, 98, 525/227, 240, 263

[56] References Cited

U.S. PATENT DOCUMENTS

| | | | |
|---|---|---|---|
| 3,562,355 | 2/1971 | Holden | 525/93 |
| 3,562,356 | 2/1971 | Nyberg et al. | 525/93 |
| 3,576,911 | 4/1971 | Maxey | 525/93 |
| 4,208,315 | 6/1980 | Zweig | 525/89 |
| 4,216,131 | 8/1980 | Himes et al. | 525/89 |
| 4,234,636 | 11/1980 | Thorsrud et al. | 428/290 |
| 4,377,658 | 3/1983 | Collins | 525/98 |
| 4,476,180 | 10/1984 | Wnuk | 524/524 |
| 4,593,062 | 6/1986 | Puydak et al. | 525/192 |
| 4,607,074 | 8/1986 | Hazelton et al. | 525/192 |
| 4,627,472 | 12/1986 | Goettler et al. | 428/34.5 |
| 4,639,487 | 1/1987 | Hazelton et al. | 525/192 |
| 4,845,145 | 7/1989 | Hazelton et al. | 525/192 |
| 4,851,468 | 7/1989 | Hazelton et al. | 525/194 |
| 4,894,408 | 1/1990 | Hazelton et al. | 525/192 |
| 4,960,830 | 10/1990 | Hazelton et al. | 525/192 |
| 5,037,888 | 8/1991 | Vanderbilt | 525/194 |
| 5,086,121 | 2/1992 | Hazelton et al. | 525/192 |

OTHER PUBLICATIONS

Concise Chemical and Technical Dictionary pp. 978–979, Chem. Pub. Co., Inc. 1947 Brooklyn, N.Y.

Primary Examiner—James J. Seidleck
Assistant Examiner—W. R. M. Clark
Attorney, Agent, or Firm—Ladas & Parry

[57] ABSTRACT

Following this procedure for the production of thermoplastic elastomer mixtures, dynamic vulcanization is performed at temperatures ranging between approximately 125 and 250 deg. C. and preferably between 150 and 200 deg. C., and with the aid of a free radical generating agent, on a mixture made up of: a) 95–60% by weight of one or several thermoplastic block copolymers of a monoalkenylarene and a coupled diene having at least two end blocks of monoalkenylarene polymer A and at least one middle block of a polymer of coupled diene O the content of said block A ranging between approximately 8 and 55% by weight respect to the copolymer, whose flow rate must exceed 0.01 and b) 5–40% by weight of one or several copolymers of ethylene and vinyl acetate, containing approximately between 5 and 50% by weight of vinyl acetate, preferably between 15 and 35% of vinyl acetate and with a flow rate between approximately 0.1 and 50, preferably between 0.1 and 10.

The partially reticulated mixtures prepared in accordance with the invention show a high resistance to ozone, to ultraviolet radiation, against tearing, and an improved resistance to solvents and abrasion.

8 Claims, No Drawings

PROCEDURE FOR THE OBTENTION OF THERMOPLASTIC ELASTOMER MIXTURES

The object of the invention is a procedure for the production of partially reticulated thermoplastic elastomer mixtures, made up of at least two copolymers. One of these copolymers is a block copolymer containing polymer blocks of a monoalkenylarene and a diene coupled together. The second copolymer is a copolymer of ethylene and vinyl acetate (EVA copolymers).

Non reticulated mixtures of block copolymers of certain monoalkenylarenes and coupled dienes and of EVA copolymers are already known. Thus, in Off Plast. Caouthc., 1978, N.261, p.394–402 it is stated that it is possible to improve resistance to ozone, ultraviolet radiation, tearing and solvents of thermoplastic styrene and butadiene copolymers by incorporating to them certain types of EVA copolymers. Various non reticulated mixtures of block copolymers of monoalkenylarenes and coupled dienes and EVA copolymers, useful in film manufacturing, are described in U.S. Pat. Nos. 4,479,180, assigned to A. J. Wnuk on Oct. 9, 1984, 3,424,649, assigned to Nybergt & Henridricks on Jan. 28, 1969, 4,082,877, assigned to Shadle on Apr. 4, 1979, 4,199,490, assigned to Kamiya, Sarake, Sone and Teraoka on Apr. 22, 1980 and 4,329,309, assigned to Kelly on May 11, 1982. Although non reticulated mixtures of thermoplastic block copolymers of monoalkenylarenes and coupled dienes and EVA copolymers, with a content of the latter higher than about 15%, generally show a high resistance to ozone, they present the disadvantage of a lack of stability arising from the incompatibility of these two types of copolymers. Said lack of stability results in a loss of the properties of these mixtures when upon further processing, e.g. in the form of extrusion or injection. Likewise the values for resistance to compression of these mixtures are very poor. These undesirable characteristics limit the use in numerous applications of non reticulated mixtures of thermoplastic block copolymers of coupled monoalkenylarenes and dienes and EVA copolymers.

Surprisingly, we have discovered that by performing a controlled "dynamic vulcanization" of the mixtures of thermoplastic block copolymers of coupled monoalkenylarenes and dienes with EVA copolymers a substantial improvement of their elastic properties is achieved, especially the values of resistance to compression and stability compared to currently known non reticulated mixtures. Partially reticulated mixtures prepared in accordance with the invention also show high resistance to ozone, ultraviolet radiation, against tearing, and an improved resistance to solvents and against abrasion.

A substantial characteristic of the compositions obtained according to our invention is that, in spite of the mixtures being partially reticulated, they can be processed and reprocessed by the conventional techniques for the transformation of thermoplastic materials, such as extrusion, moulding by injection, moulding by compression, etc. The residues or trimmings can be reprocessed.

The concept of dynamic vulcanization was first introduced by Gessler and Hasslet, U.S. Pat. No. 3,037,954. This concept is applied to the curing of a vulcanizable elastomer while it is mixed continuously with a thermoplastic polymer. In the case of mixtures of thermoplastic block copolymers of coupled monoalkenylarenes and dienes with EVA copolymers, both types of copolymer can undergo curing.

According to the invention, dynamic vulcanization is performed either during the mixing of the ingredients at a suitable temperature, in equipment such as roller mills, Banbury mixers, continuous mixers and in extrusion presses, for example, in double spindle extrusion presses, or alternatively on the mixture previously prepared in the aforementioned types of equipment.

The dynamic vulcanization of the mixtures of thermoplastic block copolymers of coupled monoalkenylarenes and dienes with EVA copolymers is achieved within the framework of the invention by using free radical generating agents, such as for example, organic peroxides, which can be aromatic or aliphatic, for example aromatic diacylic peroxides and aliphatic diacylit peroxides, dibasic acid peroxides, ketone peroxides, alkyl peroxyethers, alkyl hydroperoxides such as diacetyl peroxide, di-benzoyl peroxide, bis 2,4-dichlorobenzoyl peroxide, di-tercbutyl peroxide, tercbutyl perbenzoate, tercbutylamyl peroxide, 1,3-bis(terc-butylperoxyisopropyl) cumene, dilauroyl peroxide, succinic acid peroxide, cyclohexanone peroxide, tercbutylic peroctoate and tercbutyl hydroperoxide.

Also usable as vulcanizing agents are azides, such as azidoformiates and aromatic polyazides.

The partial reticulation of the mixtures of thermoplastic block copolymers of coupled monoalkenylarenes and dienes with EVA copolymers is carried out in bulk (internal mixing cylinder train, extrusion press).

The conditions for reticulation (type of thermoplastic block copolymer, concentration and type of EVA copolymer, concentration and type of reticulating agent, vulcanization time, temperature, etc) are selected in such a way as to ensure that the presence of gel in the mixture is not so high that it causes the mixture to lose its thermoplastic nature. The duration of the mixing operation must be enough to ensure the full decomposition of the radical-generating agent, since otherwise its presence in the final mixture might give rise to problems during further processing. The optimum values for the above mentioned parameters may be easily determined by means of prior trials, as is well known by the experts. The degree of reticulation can be measured by determining the content of gels insoluble in chlorobenzene, chloroform, etc.

In bulk reticulation it is important to distribute the reticulating agent as evenly as possible in order to avoid local overreticulations. The mixing temperature must be sufficiently high to allow the proper flow of the constituents of the mixture, and will logically depend on the nature of the copolymers used. As a rule, the mixing temperature mudt be within the approximate limits of 125 and 250 deg. C., and preferably between 150 and 200 degrees C. The upper limit is imposed by, the need to avoid any degradation of the substance during the mixing-reticulation process. The selection of the radical-generating agent must be made taking into account its mean lifetime value at the mixing temperature, as is well known by the experts. The mixtures, according to the invention, contain 95–60% by weight of thermoplastic block copolymers of coupled monoalkenylarenes and dienes and 5–40% by weight of EVA copolymer.

The thermoplastic block copolymers whose use is recommended in the present invention are known substances having polymeric blocks of monoalkenylarenes and polymeric blocks of diene coupled together. The blocks must be arranged such that there exist at least two polymeric end blocks of monoalkenylarenes A and at least a middle elastomeric block of coupled diene D. The polymeric block of monoalkenylarene must make up approximately between 8 and 55% by weight of the block copolymer. The molecular weight of the copolymer must be such that its Flow rate, determined by the ASTM D 1238 method "Standard Tex Method for Flow Rates of Thermoplastics by Extrusion Plastomer", (condition E) is higher than 0.01.

Aggarwal S. L discusses the structure and properties of this type of copolymers in the article "Structure and properties of block polymers and multiphase polymer systems: An overview of Present Status and Future Potential", Polymer, vol. 17 (Nov. 1976) p. 938-956. Two representative types of these thermoplastic elastomers are star or radial block polymers with 3-30 branches concentrated in a common chain centre, each branch being a block copolymer D-A.

In the invention, the monoalkenylarene block polymer favoured is polystyrene and the coupled diene polymers favoured are polybutadienes and polyisoprenes, with polubutadienes enjoying special favour. The preferred thermoplastic block copolymers are radial or star copolymers.

The EVA copolymers which can be used in within the framework of the present invention are linear copolymers with a random distribution of ethylene and vinyl acetate units. The EVA copolymers must contain between 5 and 50% by weight and preferably between 15 and 35% by weight of vinyl acetate. Their molecular weight must be such that the flow rate lies between approximately 0.1 and 50 and preferably between 0.1 and 10 (values determined by method ASTM D 1238, condition B).

The mixtures covered by the present invention may contain other additional constituents, added to same in order to achieve some specific improvement of their properties or simply with the aim of reducing their cost. Thus, they may for instance contain fillers and strengtheners such as calcium carbonate, calcium sulphate, coalblack, clay, silica, magnesium oxide, zinc oxide, alumina talcum, glass powder, glass fibre, etc, both in the presence and in the absence compatibilizing agents. It is likewise possible to include antistatic agents such as atoxylated amines or quaternary ammonium salts with organic substitutes containing 12-18 atoms of carbon. It is also possible to include processing lubricants known in the art.

In order to minimize the degradation of the mixtures covered by the present invention it is possible to add to the formulations stabilizing additives against the heat and antioxidant. Examples of stabilizing additives against the heat are organic phosphites and other organic substances such as trihydroxybutyrophene. Examples of primary antioxidant additives which can be used in the mixtures covered by the present invention are ester-inhibited phenols (e.g. 2,6-ditertbutyl-pcresol) and several types of aromatic amines. It is possible to use secondary antioxidant additives derived from thiodipropionic acid or aromatic phosphites. The stabilizing additives against heat and antioxidants should be added to the mixtures at levels between 0.01 and 2% by weight.

The degradation of the mixtures covered by the present invention upon exposure to ultraviolet light can be reduced below the intrinsical levels by adding photostabilizers. Examples of such photostabilizers are those derived from benzophenone. Said photostabilizers should be added to the mixture at levels between 0.01 and 3% by weight.

To the mixtures obtained in accordance with the invention pigments may be added to give them a specific colour. Pigments are added generally to the mixtures in the form of concentrates in order to ensure a better dispersion of the pigments, generally the pigments are used at levels ranging between 0.5-4% by weight.

The additional constituents described above may be added to the mixtures on their own or in combination with the others.

The thermoplastic materials covered by the present invention may be used for a broad range of applications requiring thermoplastic materials resistant to ozone, with good elastic properties and great stability.

The following examples are illustrations of the invention and do not represent limitations to same.

EXAMPLE NO. 1

In a double spindle Werner & Pfleiderer extrusion press, model ZSK-30, a mixture was prepared of EVA copolymer Pa 440 produced by Repsol Quimica S.A. (a copolymer of ethylene and vinyl acetate containing 28% vinyl acetate, flow rate according to ASTM D 1238 equal to 6 g/10 min) and a Calprene 416 rubber (star block copolymer of styrene and butadiene, 25% styrene, 75% butadiene, flow rate equal to 0.5 g/10 min.) manufactured by Repsol Quimica S.A. In order to do this, the continuous extrusion press was fed with 4 Kg/h of Calprene 416, 1 Kg/h of EVA copolymer PA 440, and 0.11% by weight of a free radical generating agent (PerKadox 1440, bis (terbutyl-peroxy-isopropyl) benzene, manufactured by AKZO). The mixing temperature was 180 deg. C.

The mixture thus obtained was subjected to 4 successive extrusions in order to study its stability and the evolution of its properties upon being reprocessed. The extrusions were carried out under the same conditions as the mixing.

Table 1 shows the variation in the toughness of the mixture subjected to the various extrusions. For the purposes of comparison it also includes the toughness values obtained by extruding under the same conditions a mixture of the same composition but prepared in accordance with prior methods, that is, omitting the addition of the free radical generating agent.

TABLE 1

| Toughness of Calprene 416/EVA PA-440, 80/20 mixtures. | | | | | |
|---|---|---|---|---|---|
| | Toughness (MPa) ASTM-638 | | | | |
| Sample | Initial | 1st Extr | 2nd Extr | 3rd Extr | 4th Extr |
| Example 1 | 100 | 102 | 94 | 95 | 92 |
| Example 1 comparison (x) | 100 | 100 | 91 | 03 | 76 |

(x) Prepared without adding Perkadox 1440

One can appreciate the increase in stability achieved by preparing the mixture according to the invention.

Table 2 concludes the results of tests measuring resistance to compression, carried out according to the ASTM 395 standard at 23 deg. C. The tests consisted of subjecting the sample to a 20% and 25% deformation for 72 hours and evaluating the degree of remaining deformation after such a treatment.

TABLE 2

Remaining compression deformation (%) according to ASTM 395 standard

| Sample | 20% Deformation | 25% Deformation |
|---|---|---|
| Example 1 | 36.5 | 41.5 |
| Example 2 comparative (x) | 44.5 | 46.5 |

(x) Mixture prepared without adding peroxide

From the values shown in table 2 it may be deduced that preparing the mixture of SBS rubber and FVA copolymer according to the invention leads to a significant improvement in the resistance to compression with respect to mixtures prepared following conventional techniques.

EXAMPLE 2

Following the procedure described in example 1, mixtures were prepared of SBS rubber, Calprene 416 and EVA copolymer PA 440 in a 80/20 ratio by weight, using various concentrations of Perkadox 1440: 0.05, 0.1 and 0.15% by weight.

Table 3 shows the values of the resistance to abrasion of the samples prepared in accordance with the invention. For the purposes of comparison a conventional mixture is included prepared under the same conditions, but omitting the addition of peroxide.

TABLE 3

Resistance to abrasion of mixtures SBS/EVA

| Sample | Perkadox 1440 % | Abrasion ISO 4648, mm | Rel. values |
|---|---|---|---|
| Example 1 | — | 261 | 100 |
| Example 2 | 0.05 | 194 | 74 |
| " | 0.10 | 180 | 69 |
| " | 0.15 | 120 | 46 |

(x) Mixture prepared without adding peroxide.

Table 3 shows the improvements regarding resistance to abrasion which can be achieved by preparing the mixtures of SBS and EVA copolymers by dynamic vulcanization, in accordance with the process which is the subject of the invention.

EXAMPLE 3 (COMPARATIVE)

A mixture was prepared of an SBS rubber and an EVA copolymer in accordance with the procedure described in example No. 1, but substituting EVA copolymer PA 440 (28% by weight of vinyl acetate, flow rate condition B, 6 g/10 min) by an EVA copolymer PA 410 (18% vinyl acetate, flow rate 150) whose flow rate is outside the limits claimed in the present invention.

Table 4 shows the results of a test for resistance to ozone, according to ASTM-2240 standard, of the mixture obtained. For comparison purposes the results obtained with the mixture from example 1, prepared according to the invention, are included.

TABLE 4

Resistance to ozone (ASTM-2240, 40% C, 50 pphm of ozone, 175 hours)

| Sample | Resistance to ozone |
|---|---|
| Example 3 (comparison) | Failed test. |
| Example 1 | Passed test. |

175 hours after commencing the test, the test tubes prepared with the mixture from example 1 did not show any cracks, whereas the test tubes from example 3 (comparison) suffered destructive effects of catastrophic proportions.

What is claimed is:

1. A process for obtaining thermoplastic elastomer mixtures, characterized by dynamic vulcanization at temperatures between approximately 125° and 250° C., with the aid of a free radical generating agent of a mixture comprising:
   a) 95-60% by weight of at least one of several thermoplastic block copolymers of a monoalkenylarene and a coupled diene, having at least two end blocks of monoalkenylarene polymer A and at least a middle block of a polymer of coupled diene D, the content of said block A being within the approximate limits of 8 and 55% by weight with respect to the copolymer, whose flow rate, as determined by ASTM D 1238 (condition B), must exceed 0.01; and
   b) 5-40% by weight of at least one of several copolymers of ethylene and vinyl acetate containing approximately between 5 and 50% by weight of vinyl acetate, and with a flow rate, as determined by ASTM D 1238 (condition B), between approximately 0.1 and 50.

2. The process according to claim 1 wherein said polymer of monoalkenylarene is polystyrene, and said polymer of coupled diene is selected from the group consisting of polybutadiene and polyisopropene.

3. The process according to claim 1 wherein the thermoplastic block copolymer of monoalkenylarene and of coupled diene has a star configuration.

4. The process in accordance with claim 1 wherein the free radical generating agent used consists of organic peroxides, with concentrations by weight with respect to the mixture ranging between approximately 0.001 and 0.20%.

5. The process according to claim 1, wherein the temperature of dynamic vulcanization is between approximately 150° C. and 200° C.

6. The process according to claim 4, wherein the concentrations of organic peroxides is between approximately 0.005 and 0.15%.

7. The process according to claim 1, wherein the copolymer of ethylene and vinyl acetate contain approximately between 15 and 35% by weight of vinyl acetate.

8. The process according to claim 1, wherein the flow rate of said at least one of several copolymers of ethylene and vinyl acetate is approximately between 0.1 and 10.

* * * * *